(12) United States Patent
Roemer-Scheuermann et al.

(10) Patent No.: US 7,361,405 B2
(45) Date of Patent: Apr. 22, 2008

(54) TRANSPARENT COLORLESS GLASS OR GLASS-CERAMIC PANEL HAVING AN OPTICALLY DENSE COLORED COATING AND METHOD OF MAKING SAME

(75) Inventors: Gabriele Roemer-Scheuermann, Ingelheim (DE); Andrea Anton, Huffelsheim (DE); Harald Striegler, Ockenheim (DE); Thomas Kraus, Nieder-Olm (DE); Gerhard Weber, Bechenheim (DE); Lutz Klippe, Wiesbaden (DE); Veit Luther, Hattersheim (DE); Petra Grewer, Wiesbaden (DE)

(73) Assignee: Schott AG, Mainz (DE)

( * ) Notice: Subject to any disclaimer, the term of this patent is extended or adjusted under 35 U.S.C. 154(b) by 289 days.

(21) Appl. No.: 10/993,741

(22) Filed: Nov. 19, 2004

(65) Prior Publication Data
US 2005/0129959 A1    Jun. 16, 2005

(30) Foreign Application Priority Data
Nov. 26, 2003   (DE)   ............... 103 55 160

(51) Int. Cl.
*B32B 17/06*   (2006.01)
(52) U.S. Cl. ............ 428/432; 428/697; 428/699; 428/701; 428/702
(58) Field of Classification Search ............ 428/428, 428/432, 697, 699, 701, 702
See application file for complete search history.

(56) References Cited

U.S. PATENT DOCUMENTS

| | | | |
|---|---|---|---|
| 4,874,462 A | 10/1989 | Makita et al. | |
| 5,212,122 A | 5/1993 | Pannhorst et al. | |
| 5,558,701 A | 9/1996 | Patel | |
| 5,716,424 A | 2/1998 | Mennig et al. | |
| 5,766,680 A | 6/1998 | Schmidt et al. | |
| 2002/0084263 A1 | 7/2002 | Wennemann et al. | |
| 2003/0006231 A1 * | 1/2003 | Nagata et al. ............... | 219/622 |
| 2003/0019864 A1 | 1/2003 | Krause et al. | |
| 2003/0019865 A1 | 1/2003 | Krause et al. | |
| 2004/0091718 A1 * | 5/2004 | Striegler ..................... | 428/426 |
| 2004/0105985 A1 * | 6/2004 | Henze et al. ............... | 428/426 |
| 2004/0115352 A1 | 6/2004 | Schultheis et al. | |

FOREIGN PATENT DOCUMENTS

| | | |
|---|---|---|
| DE | 38 41 255 C2 | 8/1993 |
| DE | 42 17 432 A1 | 12/1993 |
| DE | 44 17 405 A1 | 11/1995 |
| DE | 694 04 824 | 12/1997 |
| DE | 200 19 210 U1 | 3/2001 |
| DE | 100 14 373 A1 | 10/2001 |
| DE | 101 22 718 A1 | 11/2002 |
| DE | 103 13 630 A1 | 10/2004 |
| EP | 0 220 333 A1 | 5/1987 |
| JP | 5189517 | 7/1993 |
| WO | 96/29447 | 9/1996 |
| WO | 01/72087 A1 | 9/2001 |
| WO | 02/090280 A2 | 11/2002 |

OTHER PUBLICATIONS

Patent Asbtracts of Japan JP 2003168548, Jun. 13, 2003.

* cited by examiner

*Primary Examiner*—Gwendolyn Blackwell
(74) *Attorney, Agent, or Firm*—Michael J. Striker

(57) ABSTRACT

A transparent, colorless glass or glass-ceramic panel has a visually dense, high-temperature-stable coating having an organic/inorganic network structure containing filling material particles and a color-imparting pigment. The mechanically stable, visually dense coating has no melt-reaction zone at the surface of the panel, which is coated with the coating, so that it does not impair the panel strength. The inorganic network structure can be made from a $SiO_2$-based sol. The coating is made by introducing the color-imparting pigment and the filling material particles into a reactive organic/inorganic network structure; applying the resulting organic/inorganic network structure containing the pigment and the filling material particles to the panel to coat the panel and then burning-in the organic/inorganic network structure with the pigment and the filling material particles under thermal conditions to form the coating with no melt-reaction zone.

26 Claims, No Drawings

TRANSPARENT COLORLESS GLASS OR GLASS-CERAMIC PANEL HAVING AN OPTICALLY DENSE COLORED COATING AND METHOD OF MAKING SAME

BACKGROUND OF THE INVENTION

1. Field of the Invention

The present invention relates to a transparent, colorless glass or glass-ceramic pane;, which is exposed to a high heat load in operation and which has a full-surface or partially-covering visually dense, high-temperature-stable coating in the form of an organic/inorganic network structure provided with a color-imparting pigment.

The invention also relates to a method of making this sort of coated glass or glass-ceramic panel.

The invention further relates to a cooking unit with a coated glass or glass-ceramic panel of this sort, which provides a cooking surface.

2. Related Art

The term "glass or glass-ceramic panel" in the context of the present invention means not only flat, planar panels, but also angular, beveled and bent panels as well as curved panels. The panels can be rectangular or round or circular and also they can have other shapes. The glass panels according to the invention can only be made of glass having a very low thermal expansion coefficient and sufficiently "hard", for example of pre-stressed borosilicate glass.

The technical problem to be solved with the invention will be explained in the following with the aid of a typical application for a flat planar glass-ceramic panel providing the cooking surface of a modern cooking range, but the present invention should not be considered to be limited to that application. This technical problem also exists with glass panels providing cooking surfaces and in other applications, such as with glass or glass-ceramic fireplace window panes, glass or glass-ceramic interior windows of oven doors or glass or glass-ceramic light covers, "mutatis mutandis" in similar ways.

Cooking ranges with a glass-ceramic panel providing a cooking surface have been marketed in the art. The glass-ceramic material is transparent in the optical region of the spectrum. Thus radiation, for example from kitchen lighting, can pass through it from above, or from below, for example, from heating elements in radiatively heated cooking zones, so that heating elements, cables and other structural elements, which should be hidden under the glass-ceramic cooking surface, can be seen.

The observation of these structural elements is however considered to be troublesome for the user. Thus the glass-ceramic panels for the cooking surfaces, typically as can be seen from EP 0 220 333, are colored with color-imparting ions to reduce the transmission in the visible range, so that the operating parts of the cooking range below the glass-ceramic panel are practically invisible from above. These cooking surfaces are thus practically not transparent, i.e. opaque, for radiation in the visible range and appear to be black or for example dark red-violet or orange/brown, when viewed in transmission according to the color-imparting ions that are used. These opaque glass-ceramic materials can only be integrated in limited display forms, for example to indicate residual heat, which is a fundamental disadvantage.

A color-imparting visually dense coating applied to the underside of the translucent glass-ceramic panel providing the cooking surface in the area for introducing displays is one known solution to the problem of optical non-transparency of the glass-ceramic or glass panel. Thus JP H 7-17409 and JP 51-89517 discloses a glass-ceramic panel providing a cooking surface, which comprises a transparent, colorless glass-ceramic material with a high-temperature-resistant paint printed on its underside. This paint layer is built up so that it is made non-transparent, i.e. it replaces the otherwise conventional color, so that the cooking surface appears to be black when viewed.

In order to provide the necessary degree of optical or visual density, the paint must be applied in a comparatively thick layer. However the different thermal expansion coefficients of the glass-ceramic panel and the paint layer create the problem that cracks can appear in the paint layer or in the coated glass-ceramic surface. Furthermore the paint layer can even partially flake or peal off because of the cracking.

Transparent glass-ceramic cooking surfaces with a visually dense coating on their underside are also disclosed in DE 100 14 373 A1, which is equivalent to WO 01/72087 A1, and DE 200 19 210 U1. The underside coating provides a decoration at the same time in the case of the first reference, DE 100 14 373. A1. In contrast the underside coating is a single uniform color and the cooking surface on the top side of the panel provides a full-surface decorative coating in the case of the second reference, DE 200 19 210 U1.

Especially lustrous paints, paints based on organic materials, paints based on glass flux, especially with borosilicate glass flux and titanium or cerium oxide as pigments, colored or pigmented sol-gel coatings, which contain conventional inorganic pigments, lustrous pigments, metal effect pigments, pearlesence imparting pigments or mixtures of these pigments, are useful as paints for this coating applied to the underside of a glass or glass-ceramic panel.

The application of the paint to the underside of the glass or glass-ceramic panel occurs by printing. The glass-ceramic panel can be knobbed and also smooth on both sides. The knobbed panels are generally considerably less mechanically sensitive in comparison to the panels that are smooth on both sides. However more problems are generally encountered printing the knobbed panels.

Generally the colored underside coatings described in the previous references are not visually dense when applied with a single printing. The optical density of the coating can be increased by applied multiple layers. That is a comparatively thick underside coating is necessary to provide the required optical density.

This is of course not true for paint based on organic material, because these paints do not reduce the strength of the glass-ceramic cooking surface or only slightly reduce it. The disadvantage of these organic paints however is that they have only a limited resistance to high temperatures because of their organic components and are irreversibly discolored. Typical ingredients, such as silicone, polyester or resins, decompose above 400° C. However the cooking zone underside typically reaches temperatures up to 600° C. in continuous operation. Temperatures of as much as 800° C. can be reached for a short time. The above-mentioned organic paints decompose under heat load, whereby decomposition products are released and the coating no longer adheres after a certain time.

Besides printing a coating on the underside of the glass-ceramic panel, it is also known from DE 101 22 718 A1 to apply a plasma-sprayed coating to the underside of the glass-ceramic panel, which further increases the opacity of the glass-ceramic panel for visible light (also provides a bulk-coloring) and/or provides protection from the propagation of scattered light in halogen-heated cooking systems. Generally there are no disclosures regarding the strength of the resulting coated cooking panels in this reference. Generally this process has an especially critical variable, since the strength of the glass-ceramic panel can be considerably reduced by bombardment of the glass-ceramic surface with hot particles. Also the color choice is considerably limited in this process. Of course colored pigments can be added to the actual coating matrix, but generally the spraying of the colored pigments in this process is generally not possible because of their high melting points. Also only a certain tinting or shading of the coating is attainable with this process.

According to the state of the art several different coating steps are required during coating of a glass-ceramic panel to obtain various optical impressions, such as different colors, mixed colors, metallic colors, black. A combination of different coating methods (screen printing, vacuum coating methods) is often required, especially so that the underside coating provides a metallic impression. Sometimes the desired impression can only occur by a precise harmonization of a full-surface top side coating and underside coating. Likewise the production of the desired optical density is not possible in a single coating step and often only by combination of top side and underside coatings.

This is also true for the above-described sol-gel coatings, which are colored with the most different pigments and/or mixtures of them. Without further steps regarding composition of the sol-gel solution, the production of the colors by the pigments and application of the sol-gel colored coating to the surface of the glass-ceramic panel, the above-described disadvantages cannot be avoided.

The state of the art in the area of sol-gel coatings provides no suggestion for suitable solutions of the foregoing problems. WO 96/29447 describes pigmented sol-gel coatings for application to glass, ceramic material or metal at high temperatures. Different sols are combined with various colored pigments, in order to obtain functional coatings, e.g. against abrasion by utensils. There is no sol, which would be compatible with all particles that are used, also with no mixtures of the particles used. Also the coating of glass-ceramic is not described. The largest coating thickness obtained by a single layer application was 6 µm. In, order to obtain greater coating thickness, e.g. 10 µm, multiple coating applications are necessary. The sol-gel coating is then burned in at temperatures up to 1000° C. and because of that melted on the substrate surface, which would lead to a reduction of the strength of the coated glass-ceramic panel or glass panel.

SUMMARY OF THE INVENTION

It is an object of the present invention to provide a coating for glass panels or glass-ceramic panels exposed to high heat loads, which provides different color impressions in an economical method, if possible with a single coating step, with sufficient optical or visual density, which provides flexibility of color choice and design choice and also which maintains the strength of the glass or glass-ceramic panel after the coating process It is another object of the present invention to provide the above-described coating on glass-ceramic or glass panels with both knobbed and also smooth surfaces.

It is a further object of the present invention to provide a method of making a transparent colorless glass or glass-ceramic panel with the above-described coating with the above-described requirements are met.

These objects and others, which will be made more apparent hereinafter, are attained in a transparent, colorless glass or glass-ceramic panel, which is exposed to a high heat load in operation and which has a full-surface or partially-covering visually dense or optically dense, high-temperature-stable coating in the form of an organic/inorganic network structure containing at least one color-imparting pigment.

According to the invention the network structure contains filling material particles and the coating has no melt-reaction zone at the coated surface of the glass or glass-ceramic panel, on which the coating is formed.

According to the invention the method for coating a transparent, colorless glass or glass-ceramic panel, which is exposed to a high heat load during operation, with a visually or optically dense, high-temperature-stable coating, comprises the steps of:

a) making a reactive organic/inorganic network structure comprising a plurality of components;

b) introducing at least one color-imparting pigment and filling material particles in predetermined amounts into the reactive organic/inorganic network structure and/or into the components of that network structure;

c) applying the resulting organic/inorganic network structure including the at least one color-imparting pigment and the filling material particles introduced in step b) to the glass or glass-ceramic panel to coat the glass or glass-ceramic panel; and d) burning-in the organic/inorganic network structure including the at least one color-imparting pigment and the filling material particles under thermal conditions to form a paint coating on the glass or glass-ceramic panel, so that no melt-reaction zone is formed between the paint coating and a coated surface of the glass or glass-ceramic panel, the coated surface being covered by the paint coating.

The foundation for the paint coating according to the invention is an initial coating, which forms a reactive organic/inorganic network structure with pores after application, a so-called coating matrix, in which color-imparting pigments or coloring bodies and filling material particles are embedded and which adheres reactively to the panel surface.

In addition to other possible ways to form this sort of network structure in a preferred embodiment an initial or starting coating made with a sol-gel solution provides the basis for the paint coatings according to the invention.

Sol-gel methods, with which mechanically resistant metal oxide coatings can be made, are known. Metal-organic starting materials are reacted in the dissolved state to form the coating. The metal-organic starting materials typically build up a metal oxide network structure, i.e. a structure, in which the metal atoms are combined with each other by oxygen atoms, by controlled hydrolysis and condensation reactions, in which reaction products such as alcohol and water are inherently split off. A careful drying and typically a burning-in of sol-gel solution applied to the substrate occur, in order to remove undesired reaction products and/or remaining organic ingredients from the desired solid coating. Bubbles, which lead to hollow spaces, i.e. pores, in the sol-gel coating, which impart porosity to the coating, are produced during removal of the reaction products and the organic ingredients.

During the hydrolysis, condensation and drying stages the sol-gel solution goes from a liquid phase to a gel-like phase and finally to a solid phase when the desired solid layer forms.

When an initial sol-gel layer is used with colored pigments in an individual application, which attempts to produce a thick coating on the glass or the glass-ceramic panel, for example a 30-µm-thick coating, which is necessary to provide the required optical density, comparatively large volume hollow spaces (pores) arise in the upper part of the coating when the reaction products and the organic ingredients, especially alcohols from the lower part of the coating are driven out. This leads to dislocation or warping of pigment structures in the coating which form bulges, especially when the pigments are flake-like in nature, such as glitter pigments, special mica or glimmer pigments, e.g.IRIODINE®, which comprises mica flakes coated with metal oxides, such as titanium dioxide and/or iron oxide. These effects greatly impair the mechanical resistance or strength of the applied layer, i.e. the wear resistance and the resistance to heat loads (fluctuations).

Furthermore thick paint coatings develop stronger mechanical forces during heat exchange loads, which lead to mechanical stresses in the coated panel or plate and negatively impact mechanical strength due to the larger thermal expansion coefficients in comparison to that of the glass or glass-ceramic material. This is especially true because the sol-gel paint coatings are burned out at comparatively high temperature according to the state of the art, which leads to fusion of the colored coating in the coated panel surfaces, i.e. to a rigid material finish.

Thus the state of the art (JP 2003-168548 A) teaches application of two coatings on a glass-ceramic panel providing a cooking surface to obtain the required optical or visual density, with a thinner coating in the hot cooking zones.

In order to apply a thick paint coat in a single coating without the previously mentioned disadvantageous consequences, filling material particles according to the invention are introduced into the coating matrix, preferably in the sol-gel network structure, which are typically smaller than the pigments or coloring bodies. These filling material particles fill the hollow spaces between the coloring bodies or pigments. The shape of the filling material particles is preferably spherical like pyrolytically deposited $SiO_2$, so that the "filling degree" is as high as possible. They can also have other structures, but as far as possible they should not have a flake or leaf structure. The introduced filling material particles facilitate smaller sol-gel mass per unit volume in the paint coating, which results in less out-gassing. The coating according to the invention has finer pores as a result of the reduced out-gassing. The filling material particles align or adjust the colored pigment particles so-to-speak, so that they are not forced or bulged out because of the lesser out-gassing.

As shown by electron microscope images the colored pigment and filling material particles usually are combined in the sol-gel network structure, so that the sol-gel structure surrounds both the filling material particles and also the colored pigment particles or portions. These particles or bodies react with the sol-gel network because of the original reactivity of the sol-gel. The paint coating according to the invention is thus extraordinarily mechanically resistant, also in the case of larger coating thickness, so that it can act as a protective layer that protects the glass or glass-ceramic panel from scratching and the like.

The initial coating according to the invention permits the use of different colored pigments in a single coating matrix, i.e. a great variety of mixed colors, because of the compensating filling material particles.

Since the paint coating according to the invention is not rigidly fused onto the panel surface, but is bound with it by chemical reaction alone, which is sufficient to guarantee adherence, completely covering the surface of the glass or glass-ceramic panel with the paint coating, the paint coating does not impair or reduce the strength of the glass or glass-ceramic panel. The reason is that the differences in the thermal expansion coefficients of the paint coating and the panel are absorbed by the very fine porosity of the paint coating. The coating according to the invention is thus wear and adherence resistant as well as high-temperature-stable. Thus a full-surface coating on the underside of the glass or glass-ceramic panel does not reduce the strength of the coated glass or glass-ceramic panel. This is also true for a paint coating having a thickness of about 30 µm, which is applied in a single application.

In the following a very advantageous embodiment of a method for coating a glass-ceramic panel according to the invention with a colored sol-gel coating acting as coating matrix is described. However the invention is not to be considered to be limited to this embodiment, because other organic/inorganic network structures are conceivable.

In a first step a sol-gel solution is made. All known sols, such as $TiO_2$- or $ZrO_2$-based systems, are in principle suitable for the manufacture or making of a sol-gel coatinq matrix. $SiO_2$-based sols are especially preferred. The composition of the sol corresponds to that of a standard sol, as is used for making a thinner, optical coating with sol-gel technology. Preferably tetraethyl-ortho-silicate (TEOS) or a derivative of it is used as the Si precursor. Water, HCl and different organic solvents, such as propanol, are used as additional precursors. The exact composition of the sol can be varied within wide limits. Generally Si starting materials, such as silanes or siloxanes, are suitable.

Pigments, i.e. coloring bodies, are added in predetermined amounts to the sol that is prepared. The exact amount varies according to the coloring body used. Furthermore filling material particles are added in predetermined amounts, dependent on the amount of the coloring pigments.

The coloring bodies and/or the filling material particles can be mixed with at least one of the precursors.

The resulting paint is applied to the glass-ceramic panel. Different methods can be used for that purpose. The paint can be brushed, dipped or sprayed. Spraying is recommended as the preferred method for many applications. A very simple application of the paint coating, also in the form of a grid, can occur by screen printing. Subsequently to application the drying of the paint takes place. This can occur in the surrounding air for about a half hour, but also in only a few minutes at elevated temperatures (e. g. about 50° C.). The following burning-in can occur at different temperatures. A tempering of about 180° for 20 minutes is especially preferred. Generally shorter tempering treatments are possible without impairing coating performance.

Since moisture collects on the underside of a glass or glass-ceramic panel providing a cooking surface, it could penetrate into a porous paint coating and result in discoloration. Thus a fat- and water-impermeable outer sealer coat is preferably applied to the surface of the paint coating. The sealer coat can be transparent or colored (from black to white) and can be applied to the entire surface or only a part of it in critical regions.

The features of the invention thus provide a series of advantages:

Full-Surface Coating on the Glass/Glass-ceramic panel without Critical Reduction of Strength, even at High Temperatures:

Because of the very fine porosity of the paint coating differences between the coating and the panel are compensated, so that the occurrence of thermal stresses can be prevent or minimized. The coating made according to the above methods can thus be applied to the entire surface on the glass/glass-ceramic panel, even as an undercoating. Also adherence of the coating to the substrate is still sufficient, even at temperatures, which occur during operation of a cooking surface (e.g. at 700° C. for 10 hr).

Visually or Optically Dense Coating:

While there is usually a trade-off between coating thickness (optical density of the coating) and the strength of the glass or glass-ceramic panel because of the coating with glass-flux based coatings, a completely optically dense coating can be made with the methods according to the invention, without a critical reduction of the strength of the panel. In the case of especially good embodiments scarcely any reduction in the strength of the uncoated glass or glass-ceramic panel occurs, even after significant heating of the coated plate.

Manufacturing Technique providing Many Different Colors:

The above-described method for making the sol-gel-based particle-filled coating is known in principle. Generally it is stated that not all sols with all filling material or particles are compatible in a suitable manner and for that reason every conceivable coating of this type cannot be made. According to the state of the art different filling materials require different sols. According to the principles of the invention however it is possible to provide a coating with many different colors based on only one single sol, since the coloring bodies and filling material particles are simply and easily mixed in a suitable manner and included in the sol.

Lower Burning-in Temperatures:

With the glass-flux based coatings, which have been used up to now to provide a decoration on the glass-ceramic coating, high burn-in temperatures are necessary. Also known sol-gel-pigment layers are burned in at a high temperature. In contrast according to the invention after a short drying time at slightly elevated temperatures burning-in takes place at about 200° C. after a few minutes and an adherent strong coating arises, which is as sufficiently resistant to all further stresses and satisfactory in all requirements for an undercoat on a glass or glass-ceramic panel providing a cooking surface like coatings of the prior art, which are burned-in at higher temperatures. Also it is sufficiently wear or abrasion resistant.

Simple Application Methods:

The application of the coating occurs preferably by spraying and is thus suitable for both smooth and also knobbed surfaces. The adjustment of the coating thickness occurs simply by regulation of the substrate motion during spraying, so that the coating can already be suitably visually dense after a single application. Multiple layers are not required, but generally possible when it is necessary to provide for example an underside cooking zone marking.

Absence of a Reaction Zone:

Because of the very low burn-in temperatures the glass/glass-ceramic is not chemically attacked, which is especially shown by the absence of a reaction zone (partial melting of the surface of the glass or glass-ceramic material). Thus no critical strength reduction of the glass or the glass-ceramic occurs. The special composition of the sol, however causes a sufficient adherence at this reduced burning-in temperature.

The following example illustrates the above-described invention in more detail, but the details in this example should not be considered as limiting the claims appended hereinbelow.

EXAMPLE

First a sol of the following composition is mixed with stirring:
  40-60 g TEOS (tetraethyl-ortho-silicate)
  20 to 50 g n-propanol
  18-26 g water
  2-6 g concentrated HCl.

Also ethylene glycol is added to adjust the viscosity of the sol.

TEOS-based sols are especially suitable as coating matrix for the sol-gel coating according to the invention.

One or a combination of different color-imparting pigments are added to this sol, e.g.:
  spinel-based pigments (BASF Sicocer F 2555; Magnesium-aluminum spinel);
  oxidic pigments (Bayferox 110, 220; Chromoxide green GN; $TiO_2$, among others); and
  zirconium-based pigments (BASF Sicocer F 2255, 2355, 2360).

Preferably a glitter pigment, especially a mica pigment, such as IRIODINE®, is used to produce a metal luster effect in the coating.

The mixture ratio for pigment/sol usually amounts to 1:1 by weight. Generally it can vary from that ratio in order to obtain an optimally processed coating solution or in order to carry certain types of pigment. With certain types of pigments that provide good coverage the proportion of pigment can be reduced from 50% to about 20% by weight.

Filling material particles, which lead to fine porosity in the coating, are added to the paint pigment. For example talc, calcium carbonate and barium sulfate are suitable as filling materials. Pyrolytically deposited $SiO_2$ and $TiO_2$ are especially suitable as filling materials, since they have a globular structure and thus a special "geometry", which fills the hollow spaces, i.e. the relatively large volume pores in the sol-gel network structure and/or the spaces between the paint pigments. These pigments thus produce a fine porosity. The same is true to a special extent with glimmer paint particles (IRIODINE®), which for example have a leafy structure and are used to produce a metallic luster.

The sample according to the present example had the expected properties regarding optical density, mechanical strength and negligible action on the strength of the substrate.

The pigment-containing coating according to the invention is especially suitable in a special way as a colored undercoat for a transparent glass-ceramic panel used to provide a cooking surface. The cooking zones of the cooking surface can be heated not only electrically radiatively but also inductively, or by gas burners, especially by atmospheric gas burners, such as conventional top burners, burner mats or so-called ring burners.

Also baking oven doors, fireplace doors or lamp covers can be made from glass-ceramic material partially or completely coated with paint according to the invention.

The coating glass or glass-ceramic panels according to the invention are of course visually dense to the desired extent however they are translucent because of the embedded particles. Thus despite their visual denseness they can be illuminated from their underside, i.e. they form sort of a projection surface for markings, for example designating cooking zones, for decorations, e.g. a company logo, and for signals, such as residual heat signals. The illumination can be a single-colored or multicolored and thus can also be provided in a hot region, such as a cooking zone or cooking place. It can be static or mobile, e.g. provided by motion of optical components.

The disclosure in German Patent Application 103 55 160.3-45 of Nov. 26, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in transparent colorless glass or glass-ceramic panels coated with a visually dense pigment-containing coating and methods for making same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A coated glass or glass-ceramic panel exposed to a high heat load in operation, said coated glass or glass-ceramic panel comprising
    a transparent, colorless glass or glass-ceramic panel having a surface;
    a full-surface or partially-covering, visually dense, high-temperature-stable coating on said surface of said transparent, colorless glass or glass-ceramic panel, said high-temperature-stable coating having a no melt-reaction zone between the coating and the glass or glass-ceramic panel at said surface of said panel;
    in which said high-temperature-stable coating comprises an organic solvent-containing $SiO_2$-based sol-gel network structure, filling material particles contained in said sol-gel network structure, and at least one color-imparting inorganic pigment contained in said sol-gel network structure;
    in which said filling material particles comprise at least one member selected from the group consisting of pyrolytically deposited $SiO_2$ particles, $TiO_2$ particles, talc particles, calcium carbonate particles and barium sulfate particles;
    in which said at least one color-imparting inorganic pigment optionally comprises a glitter pigment; and
    in which said sol-gel network structure is made from a silicon-containing precursor, water, and at least one organic solvent, said silicon-containing precursor comprising a silane or siloxane.

2. The coated glass or glass-ceramic panel as defined in claim 1, wherein said at least one color-imparting inorganic pigment comprises coloring bodies and said filling material particles are smaller than said coloring bodies.

3. The coated glass or glass-ceramic panel as defined in claim 1, wherein said filling material particles have a round shape.

4. The coated glass or glass-ceramic panel as defined in claim 1, wherein said filling material particles have a spherical shape.

5. The coated glass or glass-ceramic panel as defined in claim 1, wherein said glitter pigment comprises mica particles.

6. The coated glass or glass-ceramic panel as defined in claim 1, wherein said glitter pigment comprises mica flakes coated with titanium dioxide and/or iron oxide.

7. The coated glass or glass-ceramic panel as defined in claim 1, wherein said high-temperature-stable coating has a thickness in a range from 4 μm to 100 μm.

8. The coated glass or glass-ceramic panel as defined in claim 7, wherein said thickness is from 15 μm to 30 μm.

9. A cooking unit comprising a coated glass or glass-ceramic panel exposed to a high heat load in operation, said coated glass or glass-ceramic panel comprising
    a transparent, colorless glass or glass-ceramic panel having a surface;
    a full-surface or partially-covering, visually dense, high-temperature-stable coating on said surface of said transparent, colorless glass or glass-ceramic panel, said high-temperature-stable coating having a no melt-reaction zone between the coating and the glass or glass-ceramic panel at said surface of said panel;
    in which said high-temperature-stable coating comprises an organic solvent-containing $SiO_2$-based sol-gel network structure, filling material particles contained in said sol-gel network structure, and at least one color-imparting inorganic pigment contained in said sol-gel network structure;
    in which said filling material particles comprise at least one member selected from the group consisting of pyrolytically deposited $SiO_2$ particles, $TiO_2$ particles, talc particles, calcium carbonate particles, and barium sulfate particles;
    in which said at least one color-imparting inorganic pigment optionally comprises a glitter pigment; and
    in which said sol-gel network structure is made from a silicon-containing precursor, water, and at least one organic solvent, said silicon-containing precursor comprising a silane or siloxane.

10. The cooking unit as defined in claim 9, wherein said high-temperature-stable coating is provided on an underside of said transparent, colorless glass or glass-ceramic panel.

11. The cooking unit as defined in claim 9, wherein said high-temperature-stable coating has a thickness in a range from 4 μm to 100 μm.

12. The cooking unit as defined in claim 9, wherein said at least one color-imparting inorganic pigment comprises coloring bodies and said filling material particles are smaller than said coloring bodies.

13. The cooking unit as defined in claim 9, wherein said filling material particles have a round or a spherical shape.

14. The cooking unit as defined in claim 9, further comprising means for heating cooking zones of said coated glass or glass-ceramic panel electrically radiatively, electrically inductively, or with burning gas.

15. The cooking unit as defined in claim 9, further comprising means for lighting said coated glass or glass-ceramic panel from the underside thereof.

16. The cooking unit as defined in claim 9, wherein said high-temperature-stable coating is not completely opaque and said means for lighting is formed to produce changeable images or markings in said high-temperature-stable coating for decoration and for signaling.

17. The cooking unit as defined in claim 9, wherein said coated glass or glass-ceramic panel has a fat-repellant and moisture-repellant sealer coat applied to said high-temperature-stable coating.

18. The cooking unit as defined in claim 17, wherein said sealer coat is full-surface or only covers a portion of said high-temperature-stable coating.

19. The cooking unit as defined in claim 17, wherein said sealer coat is transparent and/or colored.

20. The cooking unit as defined in claim 9, wherein the at least one color-imparting inorganic pigment comprises said glitter pigment.

21. The cooking unit as defined in claim 20, wherein said glitter pigment comprises mica particles.

22. The cooking unit as defined in claim 9, wherein said high-temperature-stable coating is made by a method comprising the steps of making the sol/gel network structure; introducing the at least one color-imparting inorganic pigment and the filling material particles in predetermined amounts into the sol/gel network structure and/or into components of the network structure; applying the sol/gel network structure including the at least one color-imparting inorganic pigment and the filling material particles to said transparent, colorless glass or glass-ceramic panel to coat the transparent, colorless glass or glass-ceramic panel and burning-in the sol/gel network structure containing the at least one color-imparting inorganic pigment and the filling material particles under thermal conditions to form said high-temperature-stable coating on the transparent, colorless glass or glass-ceramic panel, so that no melt-reaction zone is formed between the coating and the transparent, colorless glass or glass-ceramic panel.

23. The cooking unit as defined in claim 22, wherein said sol/gel network structure is prepared from a $SiO_2$-based sol and said $SiO_2$-based sot comprises said silicon-containing precursor, said water, acid, and said at least one organic solvent.

24. The cooking unit as defined in claim 22, wherein said applying of the sol/gel network structure containing said at least one color-imparting inorganic pigment and said filling material particles comprises spraying or screen printing.

25. The cooking unit as defined in claim 22, wherein said method includes drying the coated glass or glass-ceramic panel coated with the sol/gel network structure including the at least one color-imparting inorganic pigment and the filling material particles at room temperature for at least five minutes or at an elevated temperature of about 50° C. for a few minutes.

26. The cooking unit as defined in claim 25, wherein, after the drying, the sol/gel network structure including the at least one color-imparting inorganic pigment and the filling material particles is burned into the glass or glass-ceramic panel at a temperature of about 180° C. for about 20 minutes.

* * * * *